Nov. 17, 1925.

E. C. PENIN 1,561,945

FILM HOLDER FOR CINEMATOGRAPH CAMERAS

Filed May 7, 1924 — 2 Sheets-Sheet 1

Emile Christian Pénin
INVENTOR by *Otto [signature]* his Attorney.

Nov. 17, 1925.

E. C. PÉNIN 1,561,945

FILM HOLDER FOR CINEMATOGRAPH CAMERAS

Filed May 7, 1924 — 2 Sheets-Sheet 2

Emile Christian Pénin
INVENTOR:

by [signature]
his Attorney.

Patented Nov. 17, 1925.

1,561,945

UNITED STATES PATENT OFFICE.

EMILE CHRISTIAN PÉNIN, OF JOINVILLE-LE-PONT, FRANCE, ASSIGNOR TO PATHÉ CINÉMA ANCIENS ÉTABLISSEMENTS PATHÉ FRERES, OF PARIS, FRANCE.

FILM HOLDER FOR CINEMATOGRAPH CAMERAS.

Application filed May 7, 1924. Serial No. 711,551.

*To all whom it may concern:*

Be it known that I, EMILE CHRISTIAN PÉNIN, citizen of the French Republic, residing at Joinville-le-Pont, Seine, in the French Republic, have invented new and useful Improvements in Film Holders for Cinematograph Cameras, of which the following is a specification.

In the known cinematograph cameras, it is necessary when the film is to be used, to engage the end of the film of the unexposed film roll with a winding spool, which operation is complicated and annoying.

The present invention relates to a film holder for cinematograph cameras in which this drawback is obviated, while on the other hand it may be constructed in a simple manner and at a reduced expense.

The film holder according to the invention is characterized in that it comprises a socket upon which is revoluble a cap provided with an inner transverse rod co-operating with teeth provided upon the revoluble axle of the said camera, said axle being actuated through the intermediary of a friction coupling by the control handle of the apparatus, and the outer end of the film being attached to the said cap by means of an elastic ring.

Due to this arrangement, the film manufacturer can supply each roll of film entirely mounted in its holder, and the user of the camera will be no longer obliged to attach the outer end of the film to the winding axle, and the camera can now be located in daylight.

The appended drawings show by way of example an embodiment of the invention.

Figure 1:
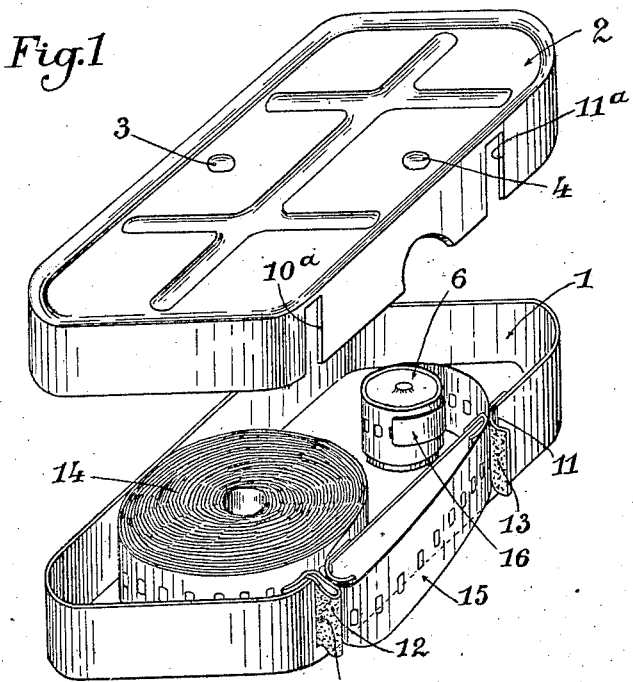
Fig. 1 is a perspective view of the box or holder with the cover removed, the film being inserted in the box, and having the position which it occupies when the film holder is placed in the camera.
Figure 2:
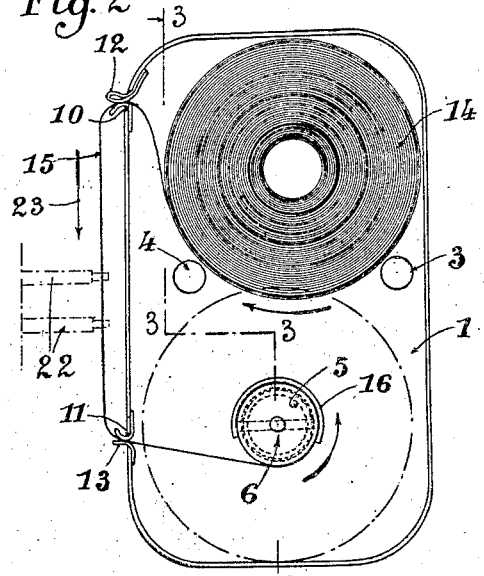
Fig. 2 is a front view of the said box with the cover removed and the film inserted.
Figure 3:
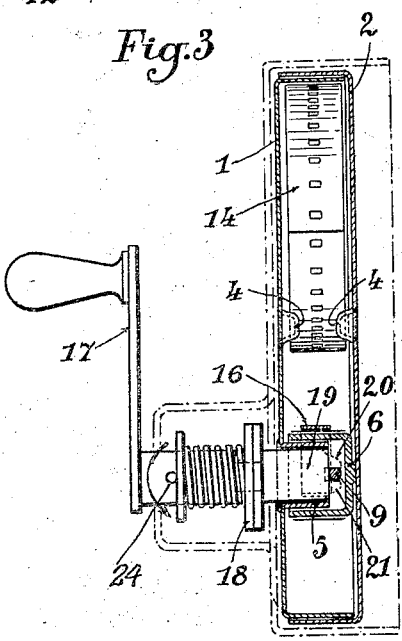
Fig. 3 is a cross section on the line 3—3—3—3 of Fig. 2; the mixed lines represent the outline of the chamber of the camera in which the film holder is disposed, as well as the operating handle of the camera.
Figure 4:
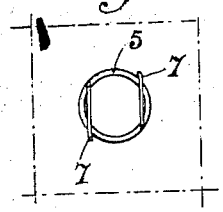
Fig. 4 is a detail view of the end of the socket which is riveted to the bottom of the box.
Figure 5:
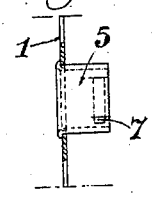
Fig. 5 is a side view of the same.
Figure 6:
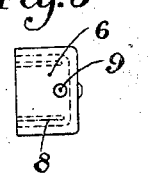
Fig. 6 is a detail view of the cap engaged upon the socket and upon which the end of the film is maintained.
Figure 7:
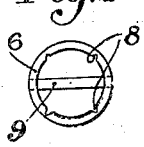
Fig. 7 is an end view of the said cap.

As shown by way of example in Figs. 1 to 3, the said film holder comprises the box portion 1 and its corresponding cover 2, each of which comprises two bosses 3 and 4 which are situated opposite each other when the box is closed. To the bottom of the box is riveted a socket 5 serving as a pivot for a cap 6 which is placed thereupon. The small spring strips 7 are fitted into saw cuts in the upper edge of the said socket, and cooperate with the internal surface of the cap 6 in which are formed the grooves 8 for this purpose. A round rod traverses the cap according to a diameter of the same. The respective heights of the socket 5 and the cap 6 as well as the position of the rod 9 are such that the said rod is disposed outwardly of the end of the said socket. Two lateral slots 10 and 11 are formed in the sides of the said box or holder, and corresponding slots 10ª and 11ª are provided in the cover 2, cooperating respectively with the first-mentioned slots when the box is closed. The slots 10 and 11 are faced with the velvet bands 12 and 13 which are attached to the sides of the box, the said bands offering a light-tight construction.

The roll of unexposed film 14 is held by the bosses 3 and 4, and the free end of the film extends out of the box through the slot 10—10ª, again entering the box through the slot 11—11ª. The end of the film is attached to the cap 6 by means of semi-circular spring 16 which clamps the film when placed upon the cap.

Fig. 3 shows the handle 17 for the travel of the film behind the lens; the said handle controls—through the control axle 24 and the friction device 18—the axle 19 which has at the end two clutch teeth 20 and 21 cooperating with the rod 9 of the cap 6.

The operation is as follows:

The film holder is prepared at the factory and has the appearance of a closed box containing a roll of unexposed film 14. Outside the box, at 15, is a portion of film which is obviously lost inasmuch as it has been handled in daylight; the said portion of film may be replaced by a piece of stout paper.

When the cinematograph camera is to be loaded, the said film holder is placed in the interior of the apparatus, and the film driving element 22 is engaged in the perforations of the film (or paper) 15 on the exterior of the box. When placing the said box in position, the shaft 19 is fitted into the socket 5 and the teeth 20 and 21 engage the rod 9 of the cap 6. With the film holder thus arranged, the camera is closed and is then ready to operate.

The handle 17 is turned in order to take the views; the shaft 9 now rotates and turns the socket 6 at the same time that the claws 22 cause the film to travel behind the lens in the direction of the arrow 23. The roll of film 14 turns upon the bosses 3 and 4, and the film leaves the box, through the slot 10—10ª. The film is exposed when passing behind the lens, and the exposed portion is again brought into the box through the slot 11—11ª and is wound upon the socket 6.

Since the claw element 22 has a constant stroke, the length of film travelling in a given time will also be constant. But as the film becomes wound upon the socket 6, the handle 17—rotating at constant speed—will have a tendency to wind a much greater length of film in a given time, due to the increase in the diameter of the wound roll of film. In order to obviate an excessive strain upon the film which might cause its rupture, a friction coupling 18 has been disposed between the handle 17 and the shaft 19.

It is observed that during the movement of the cap 6 the spring strips 7 secured to the socket 5 will act after the manner of pawls for loose wheels, by their engagement with the grooves 8 in the cap 6; said strips prevent all back motion of the cap 6 upon ceasing to operate the said handle, if shocks or jarring should occur. The unwinding of the film occasioned by such back motion would have a most prejudicial effect, for when the camera is again set in movement the film would tend to accumulate and to clog up the box, for the winding motion on the cap 6 would not suffice to take up the loose strand of the film in the box, at a sufficient rate, since the claw element 22 would be engaged in delivering the film at the same time.

However when the roll of unexposed film is rolled up without a central core as above stated, it is found that under the influence of repeated shocks and especially the jarring of the apparatus when the film holder is disposed within the latter, the spirals of the roll 14 will become loose.

When the roll is loosened, the outer spirals will come into contact with the walls of the box, thus losing their original shape and assuming a rectangular shape, and even fitting into the corners of the box. For this reason, the roll of film can no longer rotate, and when acted upon the claws of the cinematograph camera the perforations of the film will be torn.

Figure 8:
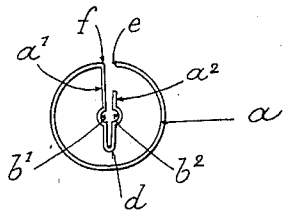
Fig. 8 is a detail view of a modified form of construction of the support for the roll of unexposed film.
Figure 9:
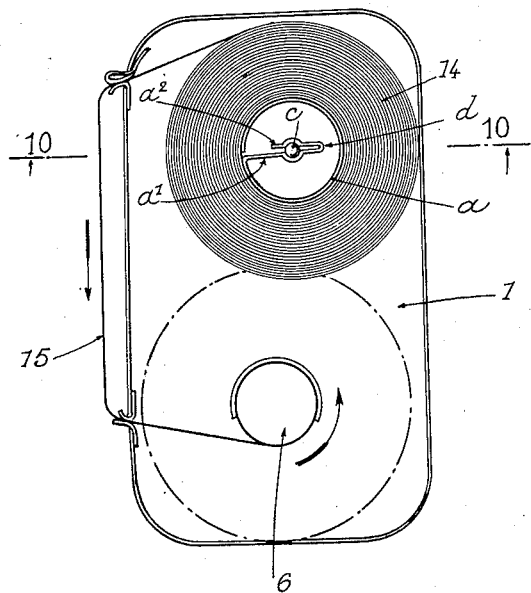
Fig. 9 is a front view of the film holder comprising the modification shown in Fig. 8.
Figure 10:
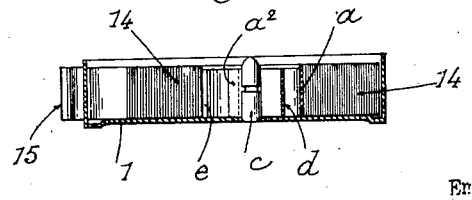
Fig. 10 is a section on the line 10—10 of Fig. 9.

This drawback is avoided by the use of the arrangement shown in Figs. 8 to 10. The roll of unexposed film 14 is wound upon a metallic device $a$ of which a plan view is shown in Fig. 8 in its usual appearance. The said device consists of a metal strip which is given a circular shape and which comprises a radial branch $a^1$, the latter being bent at $d$ so as to form a second branch $a^2$ adjacent the branch $a^1$. Upon each of the said branches, at $b^1$ and $b^2$, is formed a semi-cylindrical portion cooperating with the pivoting axle $c$ which is riveted to the bottom 1 of the said box.

During the operation of winding the film upon the drum-shaped portion of the piece $a$, since a certain pressure is thus exercised, the edge $e$ of the strip $a$ will be brought into contact with the part $f$. The said device $a$ carrying the roll of film is then mounted upon the axle $c$ by engaging the latter in the space formed between the portions $b^1$ and $b^2$. But this engagement takes place with a certain friction, since the branches $a^1$ and $a^2$ have been brought together, so that the roll of film 14 is thus clamped upon the said axle and cannot rotate in either direction.

On the other hand, no accidental unwinding of the roll of film can occur, since the piece $a$ when once pressed into place will tend to assume its normal position by reason of its elasticity, and it will thus press the inner spiral turns of the roll 14 against the outer turns, thereby preventing them from slipping upon each other, so that they cannot become unwound.

The bosses 3 and 4 of Figs. 1 to 3 which are formed upon the bottom and the cover of the said film holder can now be eliminated, since the roll of film 14 will remain wound in an approved manner upon the axle $c$ which supports the same through the intermediary of the spring piece $a$. The roll of film 14 will thus be held in the fixed position in the film holder, since the film is attached on the one hand to the spring piece $a$ which is mounted by friction upon the axle $c$ and on the other hand to the core or cap 6 upon which the strand 15 of the film is slightly stretched.

It is observed that with the present device the roll of film will be properly held in place and that it will be unaffected by the jarring of the apparatus. On the contrary, during the operation of the claw element entraining the film, and due to the friction of the branches $a^1$ and $a^2$ upon the said axle, the mass formed by the roll 14 cannot assume any advance motion which would prematurely unwind the first spiral turns, and thus prevent the unwinding of the succeeding turns.

Having now described my invention, what I claim as new and desire to secure by Letters Patent is:

1. In a film holder for cinematograph camera, the combination with a box, of a roll of unexposed film adapted to be disposed in said box, a socket in said box, a revoluble cap mounted upon said socket, a transverse rod carried by and in the interior of said cap, a control axle, teeth mounted upon said axle and adapted to be engaged by said transverse rod, a control handle, a friction coupling connecting said control axle with said handle, and an elastic ring adapted to clamp the forward end of the film upon the said cap.

2. In a film holder for cinematograph camera the combination with a box, of a roll of unexposed film adapted to be disposed in said box, a socket in said box and provided with grooves in its internal portion, small spring strips engaging the said grooves, a revoluble cap mounted upon said socket and provided with grooves formed on the internal surface of said cap, whereby the ends of said spring strips will come in friction engagement with the said grooves in the cap and work like pawls, a transverse rod carried by and in the interior of said cap, a control axle, teeth mounted upon said axle and adapted to be engaged by said transverse rod, a control handle, a friction coupling connecting said control axle with said handle, and an elastic ring adapted to clamp the forward end of the film upon the said cap.

3. In a film holder for cinematograph camera, the combination with a box, of a cover for said box, a socket in said box, a revoluble cap mounted upon said socket, a transverse rod carried by and in the interior of said cap, a control axle, teeth mounted upon said axle and adapted to be engaged by said transverse rod, a control handle, a friction coupling connecting said control axle with said handle, an elastic ring adapted to clamp the forward end of the film upon the said cap, a roll of unexposed film adapted to be disposed in said box, and bosses formed on the inner face of the box and the cover for holding said film roll in proper position.

In testimony whereof I have signed my name to this specification.

EMILE CHRISTIAN PÉNIN.